Patented Dec. 12, 1933

1,938,652

UNITED STATES PATENT OFFICE 1,938,652

HORTICULTURAL SPRAY

Amos E. Badertscher, Baltimore, Md., assignor to McCormick & Company, Inc., Baltimore, Md., a corporation of Maryland No Drawing. Application August 20, 1931
Serial No. 558,317

14 Claims. (Cl. 167—25)

This invention relates to a horticultural spray for the destruction of insects, such as for example, more particularly aphis, scale insects, red spider, and the like, such as are found on the foliage of plants and trees.

Heretofore various insecticides dissolved or carried by a suitable vehicle, for example, an oil, and suitably diluted, as for example, by emulsification with water, have been used as a spray for the destruction of insects such as found on the foliage of trees and plants.

It has recently been suggested that terpenes such as pine oil, dipentene, and the like, be used as a vehicle for insecticides, it having been found that terpenes are exceptionally advantageous as wetting agents or, in other words, are effective distributors, wetters and penetrants in connection with insecticides through their tendency to penetrate and wet the body of insects and to carry an insecticide into the insect for its destruction.

The use of terpenes as wetting agents in connection with insecticides has proved to be highly advantageous. However, it has been discovered that terpenes such, for example, as pine oil, do not volatilize readily, but to the contrary remain on the foliage for a longer time than is necessary to effect penetration of insects and for a sufficient time to burn various types of foliage.

Now in accordance with this invention, I have discovered that if where pine oil is used as a wetting agent in connection with an insecticide, dipentene, which, as is well known, is obtained as a middle cut between pine oil and turpentine, is also used, or equivalently, there is also used a terpene derivative, commercially known as solvenol, obtained by effecting the dehydration of pine oil and distillation off of the hydrocarbons formed, which comprises largely dipentene, terpinene and limonene, the advantageous wetting effect of the pine oil will be obtained and, at the sime time, the dipentene or solvenol will cause the pine oil to be volatilized rapidly with avoidance of any burning action of the pine oil upon the foliage.

As illustrative of the practical adaptation of this invention, for example, a suitable spray may involve pine oil from about 15% to 35%, solvenol or dipentene from about 35% to 40%. Any suitable insecticide may be included as, for example, nicotine or nicotine sulphate, rotenone, pyrethrins, as an extract of pyrethrum flowers, quassiin, as an extract of quassia chips, etc., etc. The spray may desirably also include a suitable soap, as for example, a rosin soap, in amount say from about 18% to 25%. The soap will act as an emulsifier where the spray is diluted with water. The spray may also contain fenchyl alcohol in amount up to say about 15%, the fenchyl alcohol having extreme toxicity for insects and while ordinarily harmful to plants and foliage, will, in the spray in accordance with this invention, be carried off with the solvenol or dipentene.

As a more specific illustration of the practical adaptation of this invention, I may use the following formula:

|  | Percent |
|---|---|
| Solvenol | 36 |
| Pine oil | 24 |
| Fenchyl alcohol | 10 |
| Kerosene extract of pyrethrum | 10 |
| Soap | 20 |

The above formula may be diluted with water to any desired extent and, for example, a spray comprising the above ingredients diluted with water on the basis of one part to 200 of water will be found satisfactory for the destruction of insects and, at the same time, may be used without injury to trees or plants.

It will now be understood that the essence of this invention lies in the use of dipentene, or the pine derivative described as comprising largely dipentene, terpinene and limonene, in connection with pine oil as a wetting agent for insecticides. It will be understood that the solvenol or dipentene and pine oil may be used in varying amounts and that any suitable insecticide and in any desired quantity may be used. Also that a suitable emulsifier may be used, as for example, a soap, as may be included and that the composition may and desirably will be diluted with water. It will be further understood that where solvenol or dipentene is used in accordance with this invention, fenchyl alcohol may be used, since any harmful effect on the foliage of the fenchyl alcohol will be negatived.

It will be understood that where in the claims appended hereto I use the term "dipentene", I mean to include dipentene as obtained as a middle cut between pine oil and turpentine and equivalently a pine derivative commercially known as solvenol and obtained by distilling off hydrocarbons formed by the dehydration of pine oil.

What I claim and desire to protect by Letters Patent is:

1. A horticultural spray including pine oil, an insecticide and dipentene, the dipentene being present in amount in excess of the amount normally present in pine oil and in quantity sufficient to substantially negative the tendency of the pine oil to burn foliage.

2. A horticultural spray including pine oil, dipentene and fenchyl alcohol, the dipentene and fenchyl alcohol being present in amounts in excess of the amounts normally present in pine oil and the dipentene being in quantity sufficient to substantially negative the tendency of the pine oil to burn foliage.

3. A horticultural spray including pine oil, an insecticide, dipentene and fenchyl alcohol, the dipentene and fenchyl alcohol being present in amounts in excess of the amounts normally present in pine oil and the dipentene being in quantity sufficient to substantially negative the tendency of the pine oil to burn foliage.

4. A horticultural spray including pine oil about 15% to 35%, dipentene about 25% to 45% and an insecticide.

5. A horticultural spray including pine oil about 15% to 35%, dipentene about 25% to 45% and fenchyl alcohol.

6. A horticultural spray including pine oil about 15% to 35%, dipentene about 25% to 45% and fenchyl alcohol about 10%.

7. A horticultural spray including pine oil about 15% to 35%, dipentene about 25% to 45%, an insecticide and a soap.

8. A horticultural spray including pine oil about 15% to 35%, dipentene about 25% to 45%, an insecticide, fenchyl alcohol and a soap.

9. A horticultural spray including pine oil, pyrethrum and dipentene, the dipentene being present in amount in excess of the amount normally present in pine oil and in quantity sufficient to substantially negative the tendency of the pine oil to burn foliage.

10. A horticultural spray including pine oil, an insecticide, dipentene, fenchyl alcohol, a soap and water, the dipentene and fenchyl alcohol being present in amounts in excess of the amounts normally present in pine oil and the dipentene being in quantity sufficient to substantially negative the tendency of the pine oil to burn foliage.

11. A horticultural spray including pine oil, dipentene in amount not less than about 25% of the pine oil and an insecticide.

12. A horticultural spray including pine oil, dipentene in amount not less than about 25% of the pine oil, an insecticide and fenchyl alcohol in excess of the amount normally present in pine oil.

13. A horticultural spray including pine oil, dipentene in amount not less than about 25% of the pine oil and pyrethrins.

14. A horticultural spray including pine oil, dipentene in amount not less than about 25% of the pine oil, pyrethrins, soap and water.

AMOS E. BADERTSCHER.